US008127521B2

(12) United States Patent
Cates

(10) Patent No.: US 8,127,521 B2
(45) Date of Patent: Mar. 6, 2012

(54) EQUINE MASK AND SUN VISOR

(76) Inventor: Yvonne Cates, San Diego, CA (US)

( * ) Notice: Subject to any disclaimer, the term of this patent is extended or adjusted under 35 U.S.C. 154(b) by 32 days.

(21) Appl. No.: 12/759,706

(22) Filed: Apr. 14, 2010

(65) Prior Publication Data

US 2011/0253064 A1    Oct. 20, 2011

(51) Int. Cl.
*B68C 5/00*    (2006.01)
(52) U.S. Cl. .......................................................... 54/80.2
(58) Field of Classification Search .................. 54/80.4, 54/80.5, 80.1; 119/850; *B68C 5/00; A42B 1/18; A01K 13/00*
See application file for complete search history.

(56) References Cited

U.S. PATENT DOCUMENTS

| | | | |
|---|---|---|---|
| 382,668 A | 4/1888 | Sullivan et al. | |
| 584,947 A | 6/1897 | Lundborg | |
| 2,407,029 A | 9/1946 | Miller | |
| 3,104,508 A * | 9/1963 | O'Hare, Jr. | 119/850 |
| 3,753,334 A | 8/1973 | Blessing | |
| 3,924,388 A * | 12/1975 | Morrison | 54/80.1 |
| 4,404,789 A | 9/1983 | Denning | |
| 4,480,429 A | 11/1984 | Knox | |
| 4,662,156 A | 5/1987 | Oettel | |
| 4,726,174 A * | 2/1988 | Wilson | 54/80.2 |
| 5,341,627 A | 8/1994 | Eby | |
| 5,345,751 A * | 9/1994 | Edwards | 54/80.2 |
| 5,440,864 A * | 8/1995 | Green | 54/80.5 |
| 6,050,068 A | 4/2000 | White, Jr. | |
| 6,128,891 A | 10/2000 | McMahon | |
| 6,216,642 B1 | 4/2001 | Hung | |
| D459,556 S | 6/2002 | Martin | |
| 6,574,948 B2 | 6/2003 | Longtin | |
| 6,786,028 B1 | 9/2004 | Longtin | |
| 7,100,349 B2 | 9/2006 | Andrews | |
| 7,204,071 B1 * | 4/2007 | Walker et al. | 54/80.5 |
| 2004/0244342 A1 * | 12/2004 | Grogoza et al. | 54/79.4 |
| 2008/0092497 A1 * | 4/2008 | Chang | 54/80.2 |

OTHER PUBLICATIONS

Equilibrium Products Catalog, Field Relief and Net Relief Products, 2009.

* cited by examiner

*Primary Examiner* — Rob Swiatek
*Assistant Examiner* — Thien Thanh Pham
(74) *Attorney, Agent, or Firm* — James Albert Ward

(57) ABSTRACT

An equine mask and sun visor combination that protects the face and eyes of the horse against several environmental insults simultaneously, including insects, water-born particulates and direct sunlight. A second layer of UV-opaque material is added to a first UV-retarding screen layer to form a sun visor disposed to protect the horse's eyes from direct sunlight and precipitation without blocking the horse's vision. The two distinct mask layers are joined in a manner that forms a single equine mask assembly which neither irritates nor discomforts the horse during long-term continuous wear.

13 Claims, 7 Drawing Sheets

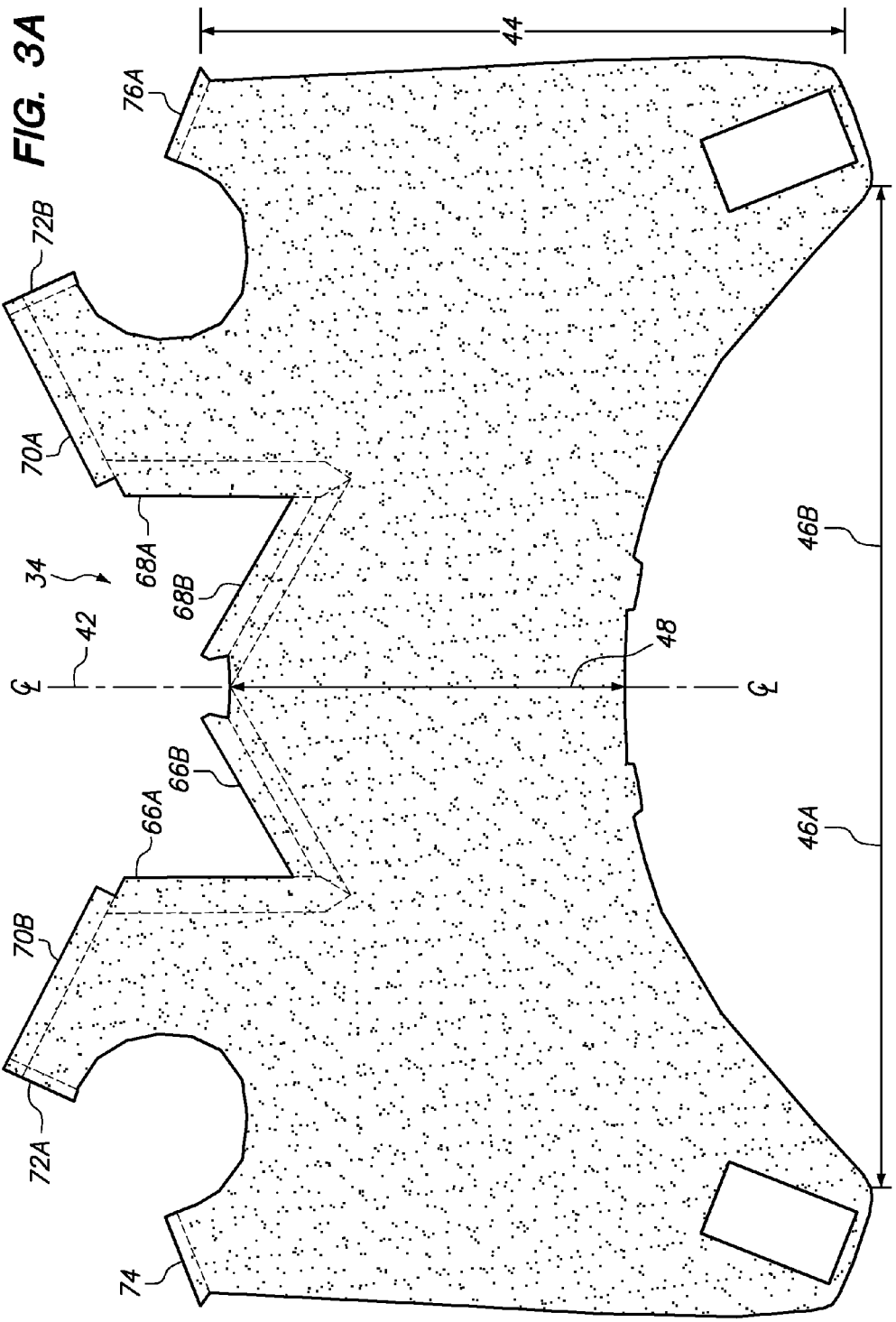

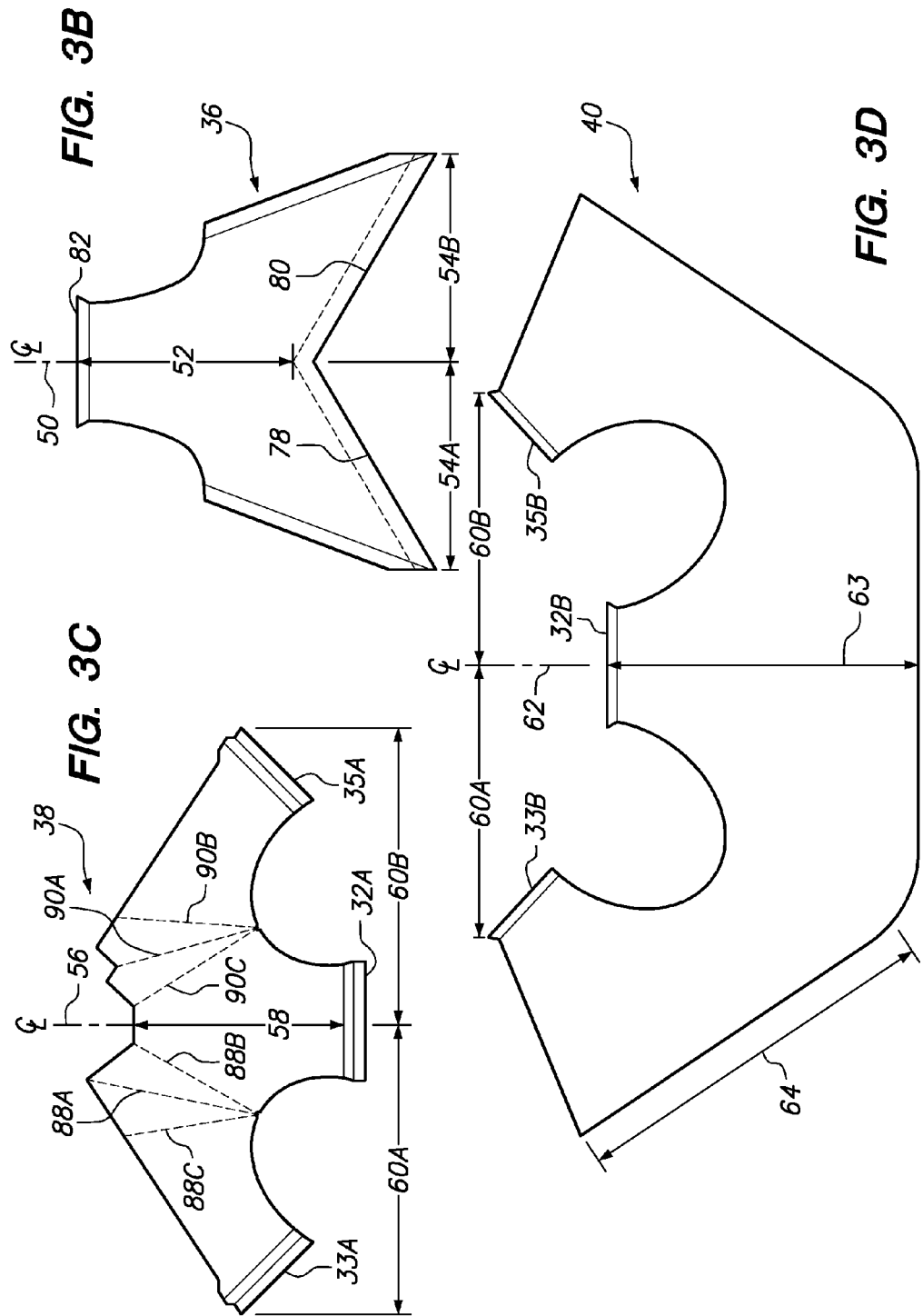

EQUINE MASK AND SUN VISOR

BACKGROUND OF THE INVENTION

1. Field of the Invention

This invention relates generally to protective coverings for domestic animals and more particularly to an equine mask and sun visor assembly.

2. Description of the Related Art

For large animals, horses tend to be very sensitive and have unique veterinary problems. Horses have a relatively "thin" skin and can have a wide variety of skin problems. The horse's skin must protect it from many environmental insults, including trauma, parasites, insects, ultraviolet (UV) light and temperature extremes, for example.

Equine skin disorders can be classified in several different ways. Specific skin problems affect specific breeds, ages, and colors of horses. Different breeds are predisposed to specific skin problems, either indirectly through breed characteristics like color, or directly through genetics. Thoroughbred horses tend to be thin skinned and more sensitive to insect irritation and inflammation. Horses with non-pigmented skin like appaloosas and paint horses with white hair and pink skin are predisposed to skin cancer, like squamous cell carcinoma. The "true gray" is associated with a familiar, unique skin cancer.

Especially in the summer, when horses are ridden more and are reproductively active, horses tend to have more injuries, skin wounds and exposure to infectious disease. Intense summer solar radiation causes sunburn and photosensitization. Flies and insects contribute to a whole host of different skin-associated problems and other disease. Even dust can be very irritating to horse's eyes when combines with precipitation. Horses with white faces often sunburn, especially on the muzzle and about the eyes. Paint horses with short coats are particularly at risk, especially those with non-pigmented skin on the top line. High SPF sunscreens can be helpful for areas that burn. Simple sunburn differs from "photosensitization" (hypersensitivity to sunlight), which is a potentially serious skin condition characterized by sunburned, crusty skin that can die and slough away. It is usually caused by a reaction to something the horse has eaten, but the skin problem doesn't appear until the horse is exposed to sunlight and the condition is especially troubling when it occurs around the eyes.

Horse masks and blankets may be helpful but often offer too little protection from sunburn to sensitive areas around the eyes, especially when the horse is housed outside and exposed to the sun for the entire day. The typical "fly" mask known in the art provides some incidental sun protection but is adapted mainly for insect screening and any sun protection is merely incidental to the primary purpose of the mask. Moreover, the typical "fly" mask provides practically no incidental protection against other environmental insults to the horse's eyes, such as dirt, dust, water and water-borne particulates.

The lack of protective pigment gives some horse breeds their flashy color but it also makes them sensitive to the harmful effects of the sun, especially around the eyes. One useful method for protecting such animals from the sun is to stable them inside a closed stable for most of the day, thereby limiting sun exposure to short outdoor excursion intervals.

But horses have evolved as gregarious and free ranging animals to spend perhaps 60% of their time grazing in less sunny latitudes and continually moving over their home range together in close knit herds. Stabled horses are restricted to one or two hours exercise per day, have restricted social interaction and restricted mealtimes, quickly eating the concentrated rations provided. In these conditions stabled horses can develop emotional problems manifesting as repetitive, invariant and apparently purposeless activities such as licking, crib biting, weaving, box walking and pawing. These activities apparently are mechanisms for coping with the prolonged periods of boredom and frustration that have been shown to significantly increase corticosteroid blood levels damaging to long-term health.

Avoiding this emotional "stable-fever" requires identification of stimulating environments for the horse, especially early in life, and the simplest such environment is outside housing. However, the current art obliges the horse owner to choose between housing a frustrated horse inside to provide protection from serious environmental insults such as UV radiation, and exposing a non-frustrated horse to such insults while housed outside during the entire long summer day.

The art is replete with various mask assemblies for horses intended to protect against insects. For example, U.S. Pat. No. 6,128,891 issued to McMahon discloses a protective mask for a horse having a cap shaped to conform to a top region of a horse's head with two sleeves integral to the cap for receiving the ears of the horse and an opening between the sleeves for passing through a forelock of the horse. McMahon's invention also includes a mesh face panel and a nosepiece sealed to prevent insects from passing under the nosepiece and having a fringed nose panel extending downward to a point short of the horse's nostrils to insects from landing on the horse's nose and from passing under the nosepiece. Other than the little incidental sun protection provided by the insect mesh, McMahon neither considers nor suggests adapting his insect mask assembly to provide protection against the sun, dust or water.

As another example, in U.S. Pat. App. Pub. No. 2008/0 092 497, Chang discloses a horse mask formed of a stiff thermoplastic mesh material with at least one swelling section formed over the horse's eyes to prevent contact with the eyes. Other than the little incidental sun protection provided by the stiff thermoplastic mesh, Chang neither considers nor suggests adapting his insect mask assembly to provide protection against the sun, dust or water.

Because of a prevalent belief that more than one mask layer is cumbersome and uncomfortable to the horse, practitioners in the art generally teach away from adding protection from other environmental insults to the horse's eyes, such as dirt, dust, water and waterborne particulates. For example, U.S. Pat. No. 5,345,751 issued to Edwards discloses a horse insect mask or halter manufactured by folding a single piece of screen material according to a pattern that ensures the formation of rigid darts in the portion of the mask corresponding to the eyes of the horse. Edwards teaches that more than one mask layer is cumbersome and uncomfortable to the horse and, other than the little incidental sun protection provided by the screen material, neither considers nor suggests adapting his insect mask assembly to provide protection against the sun, dust or water.

Although many practitioners including the inventor are convinced that outdoor housing is still the most natural and desirable stabling option for horses, the traditional fly masks, fly veils, and fly shields known in the art, at best, provide no more than a 70% ultraviolet (UV) ray block, which is not sufficient for long-term outdoor stabling.

Accordingly, there is a clearly felt need for the protection of the eyes and surrounding regions of sensitive horses during the long periods of outdoor housing from an accumulation of environmental insults such as dust, precipitation, water-borne particulates, flying insects and UV radiation. These unresolved problems and deficiencies are clearly felt in the art and are solved by this invention in the manner described below.

SUMMARY OF THE INVENTION

This invention solves these problems by adding, to a first UV-retarding mesh fore-mask layer, a second sun visor layer of UV-opaque material to form sun visor disposed to protect the horse's eyes from all direct sunlight without blocking the horse's vision. This invention arises from the unexpectedly advantageous observation that two separate mask layers may be joined in a new way to form a horse mask assembly that neither irritates nor discomforts the horse during continuous wear. For the first time, this invention permits the fabrication of a horse mask assembly that protects continuously against several serious environmental insults while screening flies and insects.

It is a purpose of this invention to protect a horse's eyes and face from serious environmental insults such as UV radiation, dirt, dust, water and water-borne particulates while housed outside for long periods without material interference with horse vision.

In a preferred embodiment, the invention is an equine sun visor assembly for a horse having a head with ears and eyes, the assembly including a sun visor shaped to conform to the top of the head and having an opening for each of the ears with a posterior visor cap portion shaped to generally conform to at least part of the posterior of the head and an anterior sun visor formed of a substantially opaque material coupled to and extending from the posterior visor cap portion and having a width sufficient to extend laterally across both eyes and a length sufficient to shade the eyes from direct sunlight, and a fore-mask panel coupled to and extending from the posterior visor cap portion under the anterior sun visor and having a width sufficient to extend laterally across both eyes and a length sufficient to cover both eyes.

The foregoing, together with other objects, features and advantages of this invention, can be better appreciated with reference to the following specification, claims and the accompanying drawing.

BRIEF DESCRIPTION OF THE DRAWINGS

For a more complete understanding of this invention, reference is now made to the following detailed description of the embodiments as illustrated in the accompanying drawing, in which like reference designations represent like features throughout the several views and wherein:

FIG. 3A illustrates a scaled pattern view of the fore-mask panel element of the equine sun visor assembly embodiment of FIG. 1 before assembly;

FIG. 3B illustrates a scaled pattern view of the fore-mask stabilizer element of the equine sun visor assembly embodiment of FIG. 1 before assembly;

FIG. 3C illustrates a scaled pattern view of the posterior visor cap element of the equine sun visor assembly embodiment of FIG. 1 before assembly;

FIG. 3D illustrates a scaled pattern view of the anterior sun visor element of the equine sun visor assembly embodiment of FIG. 1 before assembly;

DETAILED DESCRIPTION OF THE EMBODIMENTS

One work-around solution to this problem attempted by the inventor was to add duct tape to the upper portion of a traditional fly mask to enhance the sun block efficiency. This was found to be only temporary and required frequent replacement. Once removed, the tape also left a sticky residue that attracted dust and debris, increasing mask irritation to the horse.

The inventor continued to experiment and eventually created an assembly that is durable, fits comfortably, and provides consistent shielding protection.

Figure 1:
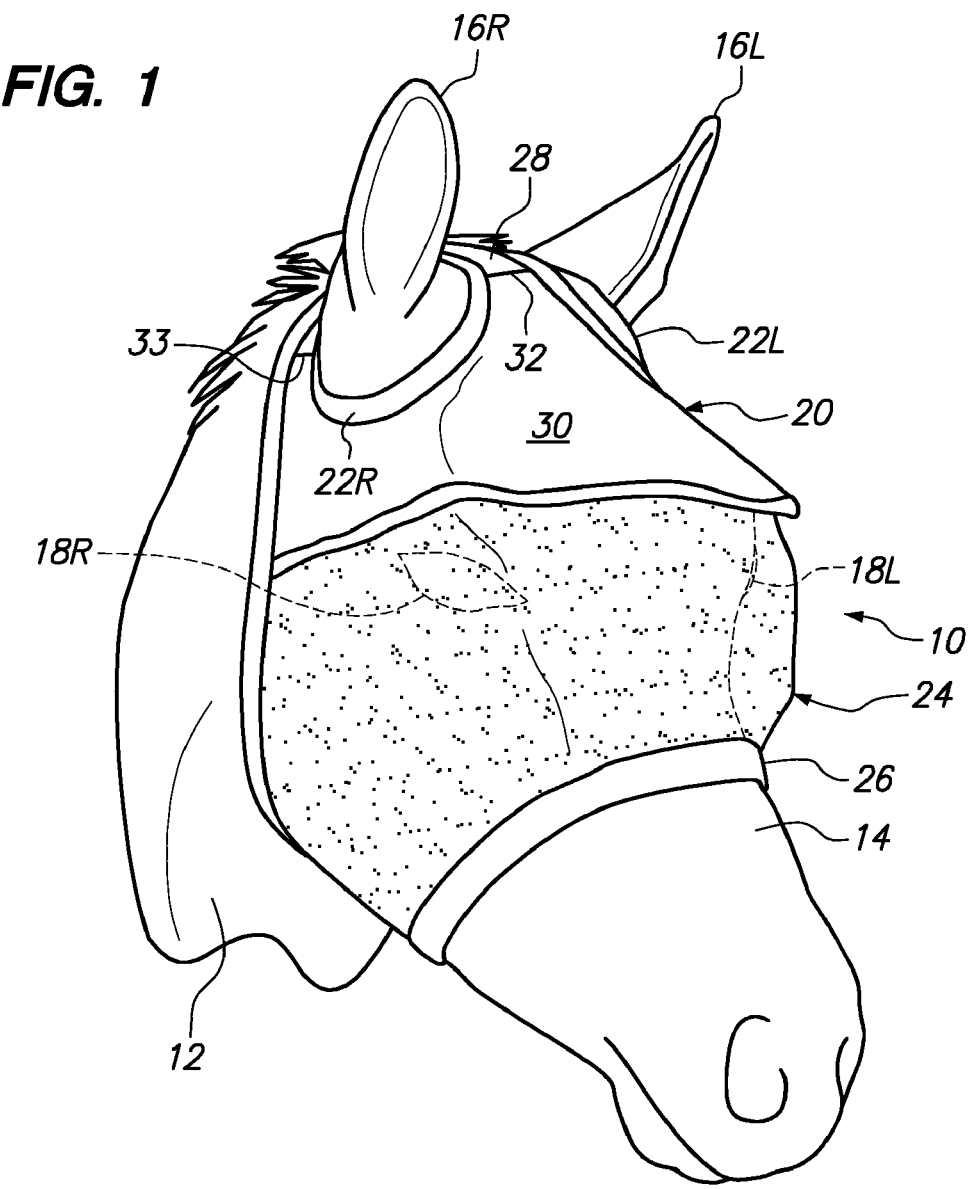
FIG. 1 is a sketch illustrating an oblique perspective view of a preferred embodiment of the equine sun visor assembly of this invention fitted on a horse.

FIG. 1 provides an oblique perspective view of a preferred embodiment 10 of the equine sun visor assembly of this invention fitted on a horse 12 having a head 14 with ears 16R-16L and eyes 18R-18L. Equine sun visor assembly 10 further includes a sun visor 20 with the two openings 22R-22L for ears 16R-16L and a fore-mask panel 24 terminating in a muzzle seal 26 disposed to prevent insects and debris from passing under fore-mask panel 24.

Figure 2:
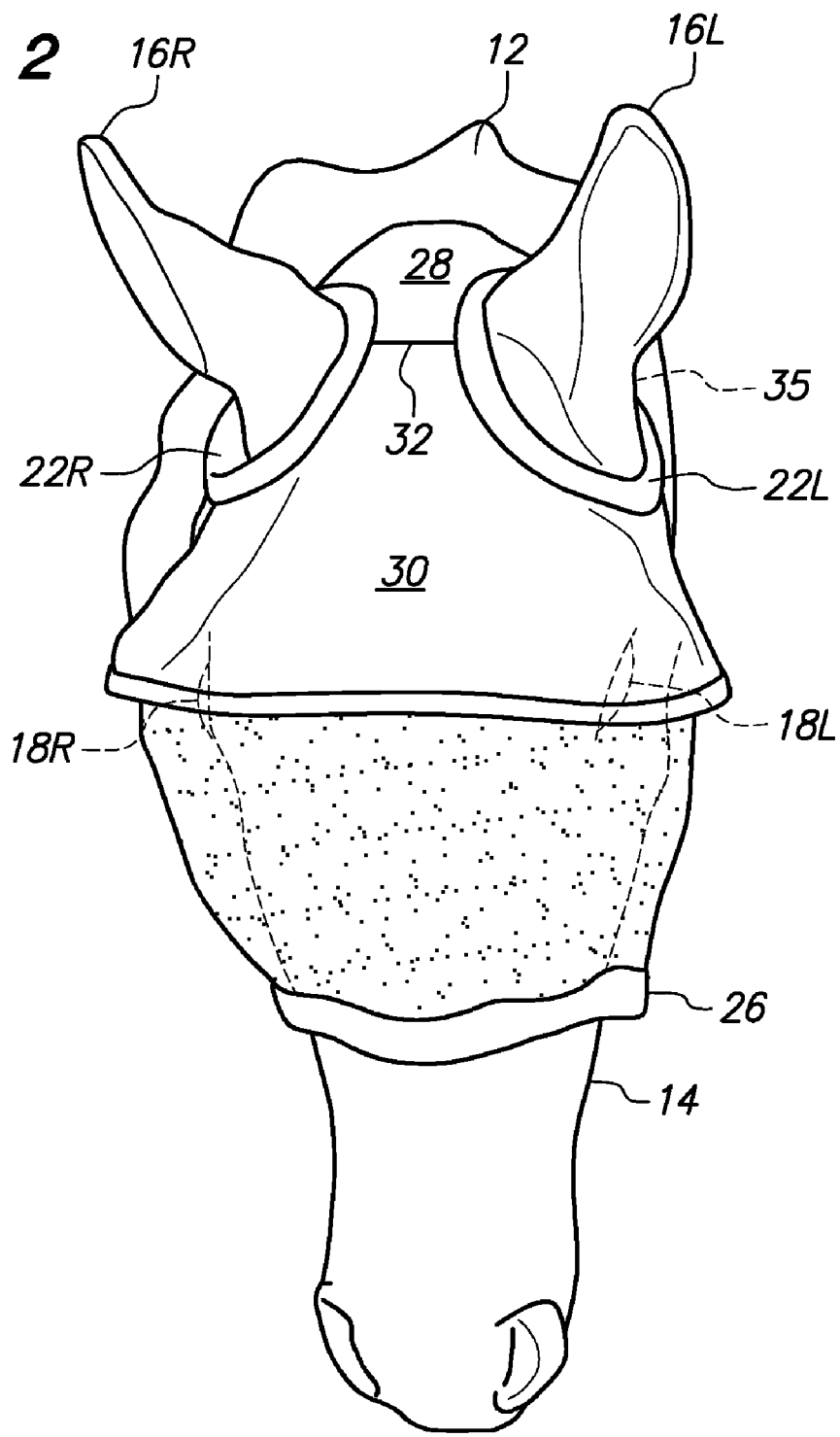
FIG. 2 is a sketch illustrating a front perspective view of the equine sun visor assembly embodiment of FIG. 1 fitted on a horse.

FIG. 2 provides a front perspective view of equine sun visor assembly 10 and better illustrates the structure of sun visor 20, which includes a posterior visor cap portion 28 fitted to the posterior of head 14 and the anterior sun visor 30, which is coupled to and extends from posterior visor cap portion 28 at the anterior seams 32, 33 (FIG. 1) and 35 (hidden) to shield eyes 18R-18L from light and precipitation arriving generally from above without blocking the lateral vision of horse 12, substantially as shown in FIGS. 1-2.

Although not visible in FIGS. 1-2 (see FIG. 5), fore-mask panel 24 is coupled to posterior visor cap portion 28 at anterior seams 32, 33 and 35 to ensure that anterior sun visor 30 is precisely disposed to provide optimal protection from ultraviolet (UV) light and precipitation from above without impairing the vision of horse 12. Anterior sun visor 30 is wide enough to extend laterally across both eyes 18R-18L and long enough to provide protection from UV light and precipitation arriving from the front, sides, and above, substantially as shown. The protection from precipitation is an important feature of this invention which is needed for the many horses suffering from chronic conjunctivitis, a condition caused by irritating effects of dust & debris, which is often transferred to the eyes by precipitation.

The "wrap-around" disposition and the precise location control of anterior sun visor 30 is an important feature of this invention. The precise placement of anterior sun visor 30 ensures optimal protection without interfering with the horse's vision. Eyes 18R-18L are located bilaterally on the sides of head 14, which provides horse 12 with monocular peripheral vision and a nearly 360 degree field of view. This requires the precise control of visor location during the usual horse activities to avoid interfering with vision or losing protection over long periods of wear.

In accordance with this invention, fore-mask panel 24 is formed of a substantially translucent mesh material adapted to screen insects and larger particulates without substantially interfering with vision, as discussed below in connection with FIG. 4.

In accordance with this invention, anterior sun visor 30 (and preferably posterior visor cap portion 28) is formed of a substantially opaque fabric material adapted to block 98% of all UV light and is sufficiently water-repellant to properly block and redirect runoff of all precipitation, as discussed below in connection with FIG. 5.

Figure 4:
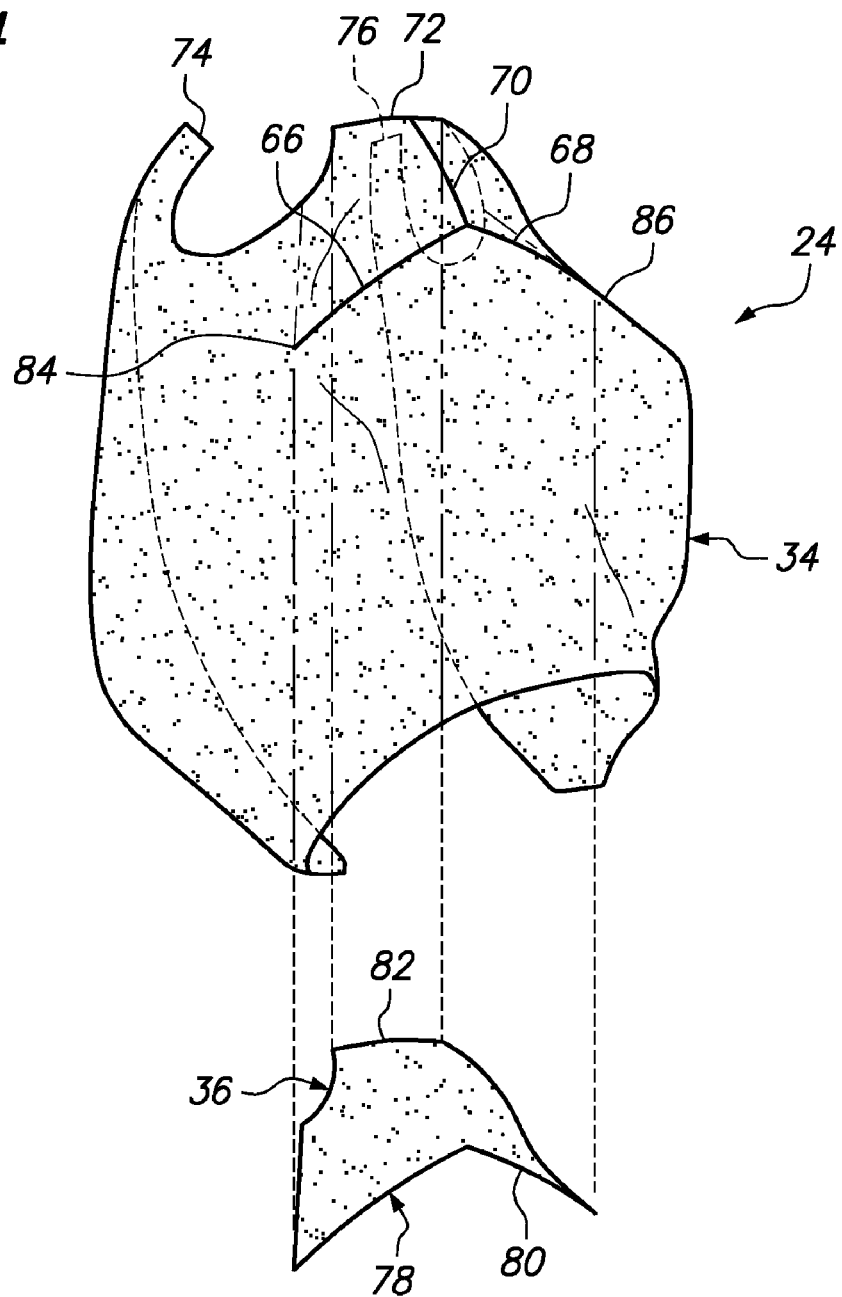
FIG. 4 is a sketch illustrating an oblique perspective view of the assembly of the fore-mask panel and fore-mask stabilizer elements of FIGS. 3A and 3D to form a stiffened fore-mask element of the equine sun visor assembly embodiment of FIG. 1.

FIG. 3A provides a scaled view of the fore-mask panel pattern 34 as it appears before assembly to form fore-mask panel 24 (FIGS. 1-2 and 4). Pattern 34 is symmetrical about the centerline 42 and is usefully scaled for a typical horse head size when the dimension 44 is sized at about 16.5 inches, the dimensions 46A-46B are both sized at about 12 inches and the dimension 48 is sized at about 9.5 inches. Pattern 34 may be scaled up or down to better fit other horse heads in accordance with the discussion of FIG. 6 below.

FIG. 3B provides a scaled view of the fore-mask stabilizer pattern 36 as it appears before assembly to form fore-mask panel 24 (FIGS. 1-2 and 4). Pattern 36 is symmetrical about the centerline 50 and is usefully scaled for a typical selection of mesh materials when the dimension 52 is sized at about 5 inches and the dimensions 54A-54B are both sized at about 5 inches. Dimension 52 is preferably adjusted as necessary (for example, lengthened so that edge 78 is parallel to and collinear with edge 80) to accommodate differing stiffness in the fore-mask pattern mesh material(s) while providing the preferred "bulge" over eyes 18R-18L in fore-mask panel 24. Pattern 36 may be scaled up or down with pattern 34 as necessary to better fit other horse heads in accordance with the discussion of FIG. 6 below.

Figure 5:
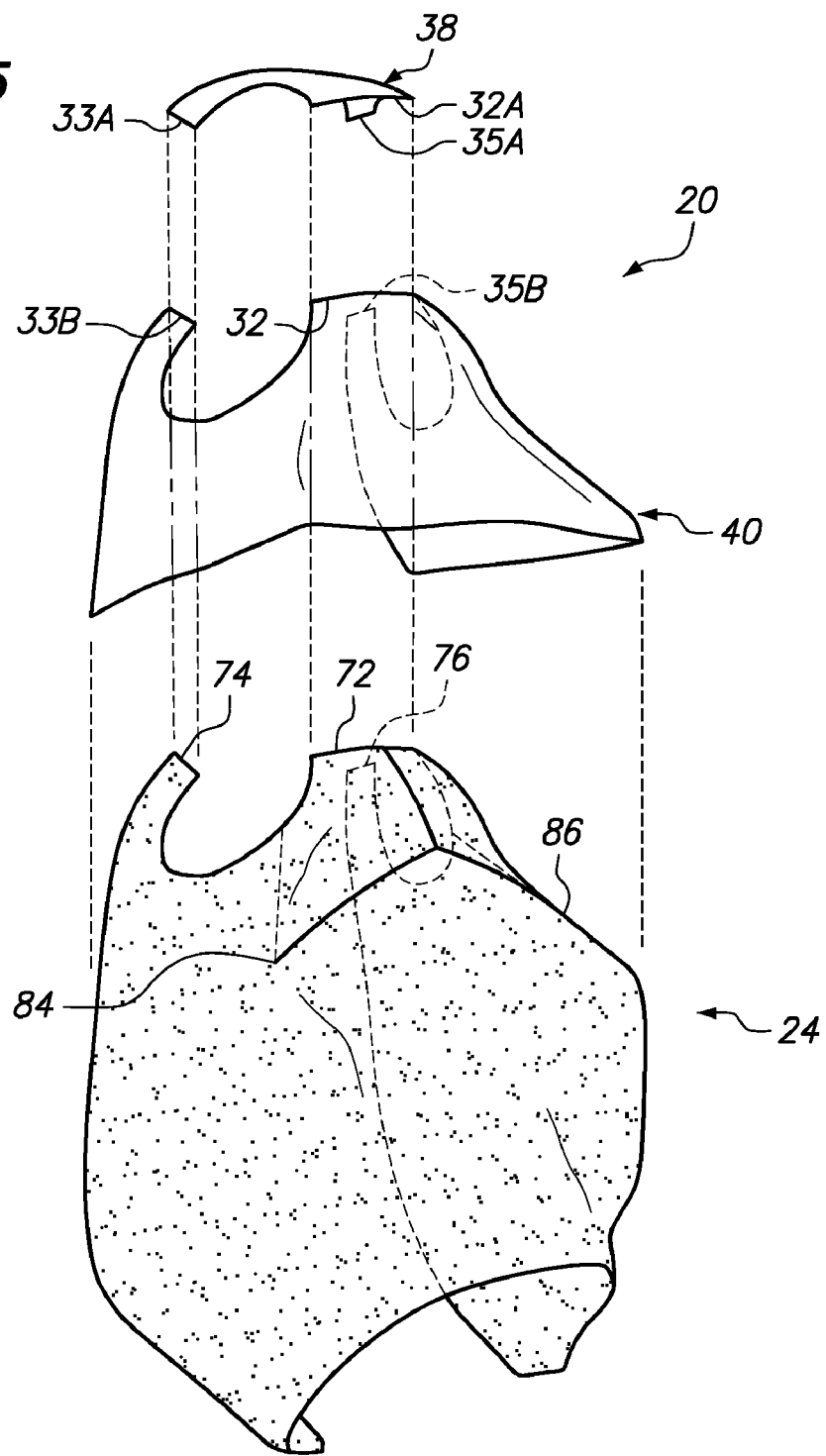
FIG. 5 is a sketch illustrating an oblique perspective view of the assembly of the posterior visor cap portion and the anterior sun visor elements of FIGS. 3-D with the stiffened fore-mask element of FIG. 4 to form the main portion of the equine sun visor assembly embodiment of FIG. 1.

FIG. 3C provides a scaled view of the posterior visor cap pattern 38 as it appears before assembly to form sun visor 20 (FIGS. 1-2 and 5). Pattern 38 is symmetrical about the centerline 56 and is usefully scaled for a typical horse head size when the dimension 58 is sized at about 5 inches and the dimensions 60A-60B are both sized at about 6.5 inches. Pattern 38 may be scaled up or down with pattern 34 to better fit other horse heads in accordance with the discussion of FIG. 6 below.

FIG. 3D provides a scaled view of the anterior sun visor pattern 40 as it appears before assembly to form sun visor 20 (FIGS. 1-2 and 5). Pattern 40 is symmetrical about the centerline 62 and is usefully scaled for a typical horse head size when the dimension 63 is sized at about 7 to 7.5 inches, the dimension 64 is sized at about 10 inches and dimensions 60A-60B are both sized at about 6.5 inches. Pattern 38 may be scaled up or down with pattern 34 to better fit other horse heads in accordance with the discussion of FIG. 6 below.

FIG. 4 provides an oblique assembly view of fore-mask panel 24 showing how fore-mask panel pattern 34 (FIG. 3A) and fore-mask stabilizer pattern 36 (FIG. 3B) are assembled to form fore-mask panel 24 with sufficient stiffness to retain the form necessary to better support itself and sun visor 20 above the face and eyes 18R-18L of horse 12.

First, fore-mask panel pattern 34 is folded to permit the seams 66, 68 and 70 to be joined substantially as shown. Seam 66 is formed by joining the edge 66A to the edge 66B (FIG. 3A), seam 68 is formed by joining the edge 68A to the edge 68B (FIG. 3A), and seam 70 is formed by joining the edge 70A to the edge 70B (FIG. 3A) in any useful manner, such as, for example, with stitching or permanent fabric adhesive.

Upon proper assembly, the edges 72A-72B (FIG. 3A) come together to form the edge 72 shown in FIG. 4 while the edges 74-76 remain separated but are now preferably generally disposed in common elevation with edge 72 substantially as shown in FIG. 4 (showing edge 74 with edge 76 hidden).

Finally, fore-mask stabilizer pattern 36 is joined along all edges to the interior (preferably) of the folded fore-mask panel 34 in any useful manner, such as, for example, with stitching or permanent fabric adhesive so that the edge 78 is generally coincident with seam 66, the edge 80 is generally coincident with seam 68, and the edge 82 is generally coincident with edge 72, substantially as shown This selectively stiffens the upper portion of fore-mask panel 24 and urges the eye points 84 and 86 well above eyes 18R-18L, respectively, of head 14 when fore-mask panel 24 is properly disposed on horse 12 (FIGS. 1-2). This selective stiffening also provides optimal support and position control of anterior sun visor 30 when assembled with folded fore-mask panel 34 in the manner now described in connection with FIG. 5.

The inventor has identified several exemplary fabric materials suitable for use in fabricating the fore-mask panel (and the fore-mask stabilizer) element of this invention, exemplified by fore-mask panel 24 (FIG. 4). These include, for example Textilene® 80 Solar Screen PVC-coated woven polyester fabric, Textilene® 90 Solar Screen PVC-coated woven polyester fabric, Textilene® 95 Solar Screen PVC-coated woven polyester fabric, PolyCB2™ MX90 PVC-coated woven polyester fabric, and Sunsure® PVC-coated woven polyester fabric. All of these materials block at least 80% of all incident UV light. Additionally, Phifertex Plus™ Mesh vinyl encapsulated polyester fabric may be suitable for the fore-mask stabilizer element but is not recommended for fore-mask panel element.

Phifertex® is a polyester finished vinyl-encapsulated mesh commonly available for use in lawn and patio furniture, umbrellas, office furniture, orthopedic equipment, upholstery, safety vests, and unique heat-filtering awnings. Phifertex Plus is a mesh fabric designed specifically for sling and umbrella applications, woven into a stronger 42×12 mesh (0.018 warp/0.025 fill).

Textilene® 80 fabric blocks up to 80% of the sun's rays, Textilene® 90 fabric blocks up to 80% of the sun's rays and Textilene® 95 fabric blocks up to 95% of the sun's rays. Textilene® is a PVC-coated woven polyester solar screen mesh fabric in a plain weave using 0.025" diameter vinyl-coated 1000 denier polyester core yarn in the warp and fill. Textilene® 90 Solar Screen fabric is useful for reducing heat transfer through windows. is flame resistant and fade resistant, and can endure years of use in applications such as awnings, umbrellas and window screens.

Sunsure® is a PVC-coated woven polyester designed to withstand fading, mildew, soiling and wear and tear for outdoor use. With shade factors up to 92%, Sunsure fabric is useful for umbrella and awning applications. Fabric: PVC Coated Woven Polyester Finish: Flame retardant-California State Fire Marshal-101-53 & 117 E PolyCB2™ Standard Mesh (17/14 Weave) is suitable for all harsh environment applications and/or high damage-prone areas. PolyCB2™ Fine Mesh (20/17 Weave) provides protection from the smallest insects and is a medium privacy screen as well as being a medium solar-block screen. The fine weave and filtering characteristics create a see-through visibility of 88% at 20 feet and less than 30% at 100 feet (in equal lighting).

PolyCB2™ MX90 is a heavy-duty mesh designed for the many applications that require additional strength with slightly larger pores. This screen is ideal for use as overhead shade screen and blocks 90% of the sun's rays.

FIG. 5 provides an oblique assembly view showing how posterior visor cap pattern 38 (FIG. 3C) and anterior sun visor pattern 40 (FIG. 3D) are assembled to form sun visor 20 (FIGS. 1-2) and how sun visor 20 is attached to stiffened fore-mask 24 (FIG. 4) to form the main portion of equine sun visor assembly 10 (FIG. 1).

First, referring to FIG. 3C, posterior visor cap pattern 38 is folded on the line 88A and the seams 88B-88C are joined in any useful manner, such as, for example, with stitching or permanent fabric adhesive. Similarly, posterior visor cap pattern 38 is folded on the line 90A and the seams 90B-90C are joined in any useful manner, such as, for example, with stitching or permanent fabric adhesive. These operations form posterior visor cap pattern 38 into posterior visor cap portion 28, which thereby generally conforms to at least part of the posterior of head 14.

Next, sun visor 20 is formed by joining the edge 32A (FIG. 3C) to the edge 32B (FIG. 3D) to form anterior seam 32 (FIGS. 1-2), joining the edge 33A (FIG. 3C) to the edge 33B (FIG. 3D) to form anterior seam 33 (FIG. 1), and joining the edge 35A (FIG. 3C) to the edge 35B (FIG. 3D) to form anterior seam 35 (FIG. 2, hidden) in any useful manner, such as, for example, with stitching or permanent fabric adhesive.

Finally, sun visor 20 is joined to fore-mask panel 24 at anterior seams 32, 33 and 35 of posterior visor cap portion 28, preferably leaving anterior sun visor 30 generally free of fore-mask panel 24 except for where they both join at anterior seams 32, 33 and 35. As may be appreciated by referring to FIGS. 3A and 4 as described above, this is preferably accomplished by joining edge 72 at seam 32, edge 74 at seam 33 and edge 76 at seam 35 (hidden) in any useful manner, such as, for example, with stitching or permanent fabric adhesive.

The inventor has identified several exemplary fabric materials suitable for use in fabricating the sun visor element of this invention, exemplified by sun visor 20 (FIG. 5). These include, for example, Cordura® Back Pack Nylon, "Pack Cloth" Nylon, and Rip-stop Nylon. All of these materials block at least 98% of all incident UV light.

Cordura® Back Pack Nylon is an "air treated" nylon fabric originally designed by DuPont. It's characterized by a rough, fuzzy texture on the outside, and a somewhat rough texture on the inside. The chief advantages of Cordura® fabric are its abrasion resistance and light weight. Coated Cordura® fabric is considered to be waterproof.

"Pack Cloth" Nylon (as it is commonly known in the industry) is a smooth nylon material with threads of equal diameter running in the warp (vertical) and fill (horizontal) directions. Although a somewhat heavier fabric, the chief advantages of pack cloth nylon are its ready acceptance of urethane waterproofing, abrasion resistance, and excellent puncture resistance.

Rip-stop Nylon is starting to emerge in the marketplace, and is easily distinguished by its regular "grid" pattern of heavy threads sewn in the warp and fill directions every quarter-inch. The heavy threads "stop rips" if the pack is punctured or torn. Nylon, when torn, has a tendency to start unraveling. The main advantages of rip-stop nylon are its ready acceptance of waterproofing and its lightness in weight. It's not as puncture resistant as pack cloth nylon, but just about as abrasion resistant.

The inventor has compiling measurements of facial landmarks from a number of different horse breeds and sizes. From these data, the inventor has developed the patterns disclosed in FIGS. 3A-D and described above to achieve the best fit possible for any horse.

Figure 6:
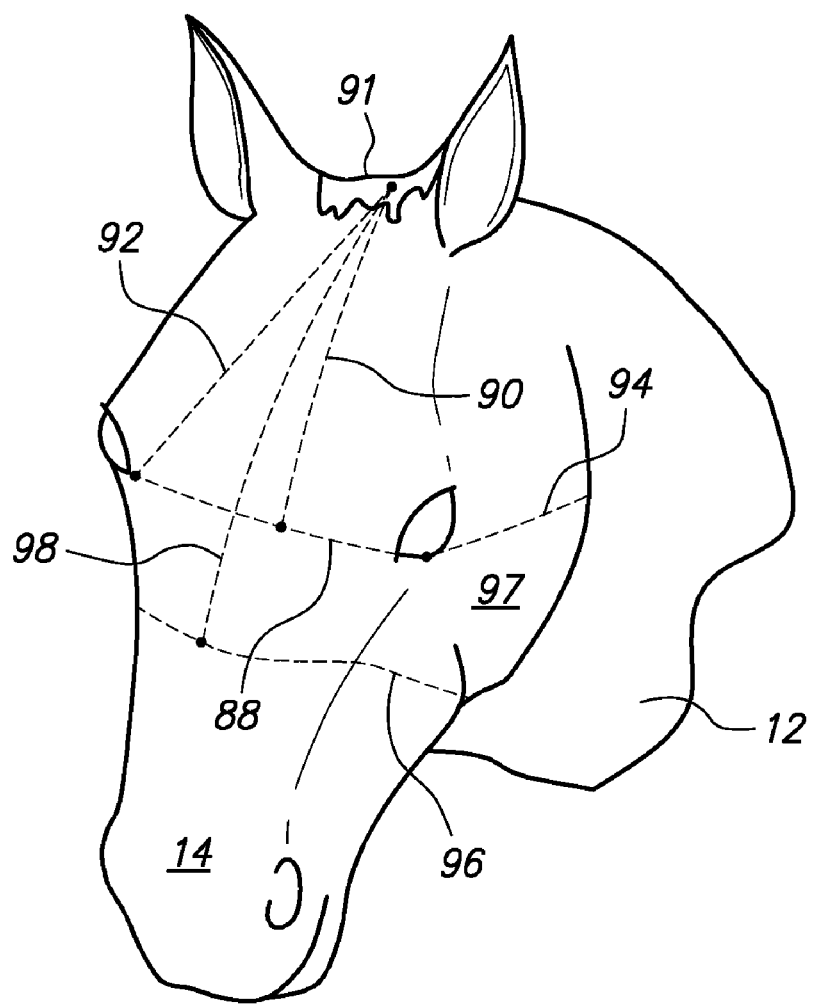
FIG. 6 is a sketch illustrating an oblique perspective view of the head measurements preferred for determining the pattern dimensions of the four equine sun visor assembly elements of FIGS. 3A-D.

FIG. 6 is a sketch illustrating an oblique perspective view of the head measurements preferred for determining the pattern dimensions of the four equine sun visor assembly elements of FIGS. 3A-D. The six measurements preferred for proper size, fit and placement of the equine sun visor of this invention (to ensure proper protection without blocking horse vision) are the distance 88 across the forehead between the tear ducts of both eyes, the perpendicular distance 90 from the pole 91 to the line marking distance 88 between the tear ducts, the diagonal distance 92 from the pole 91 to one eye tear duct, the radial distance 94 between one tear duct and the throat latch, the distance 96 completely around nose 14 under the jowl 97, and the distance 98 from the pole 91 to the line marking distance 96.

Distance 88 determines dimensions 54A and 54B (FIG. 3B), and distance 92 determines the diagonal distance from the bottom of dimension 64 (FIG. 3D) at the curve in anterior sun visor 40 to the top of dimension 58 (FIG. 3C) when posterior visor cap 38 (FIG. 3C) is joined at edge 32A to anterior sun visor 40 (FIG. 3D) at edge 32B to form sun visor 20 (FIGS. 1-2). Distance 92 may also be appreciated in FIG. 2 as the measured distance from the posterior central point of posterior visor cap portion 28 diagonally across anterior sun visor 30 to a point just above either of eyes 18R and 18L. Distance 52 (FIG. 3B) is selected to force fore-mask panel 24 outward over eyes 18R-18L and bend the anterior edge of anterior sun visor 30 at the curves (FIG. 3D), thereby shading eyes 18R-18L from above without blocking lateral horse vision (an important element of this invention). Distance 90 determines the sum of dimensions 58 and 63 (FIGS. 3C-3D). Distance 94 determines dimension 64 (FIG. 3D). Distance 96 determines dimensions 46A and 46B (FIG. 3A), which preferably provide the snug, but not tight fit, around the nose bridge below jowl 97 found to inhibit insect entry under fore-mask panel 24 (FIGS. 1-2). Finally, distance 98 determines the sum of mask panel distance 48 (FIG. 3A), seam 70 (FIG. 4) and dimension 58 (FIG. 3C).

The equine sun visor of this invention provides prophylaxis against disease processes caused by solar radiation, dust, & debris, and face flies and also is comfortable for the horse, avoiding the "quiet suffering" seen so often by large animal veterinarians. Some of the specific needs addressed are photosensitivity of the eye area and nictating membrane as well as conjunctivitis due to irritating airborne dust and debris. The assembly of this invention is also useful in treatment applications for horses that have experienced traumatic eye injury such as corneal abrasion.

Clearly, other embodiments and modifications of this invention may occur readily to those of ordinary skill in the art in view of these teachings. Therefore, this invention is to be limited only by the following claims, which include all such embodiments and modifications when viewed in conjunction with the above specification and accompanying drawing.

I claim:

1. An equine sun visor assembly for a horse having a head with ears and eyes, the assembly comprising:

a sun visor shaped to generally conform to the top of the head and having an opening for each of the ears, including a posterior visor cap portion shaped to generally conform to at least part of the posterior of the head, and an anterior sun visor formed of a substantially opaque material coupled to and extending from the posterior visor cap portion and having a width sufficient to extend laterally across both eyes when in use and a length sufficient to shade the eyes from direct sunlight; and a fore-mask panel coupled to and extending from the posterior visor cap portion between the anterior sun visor and the head when in use and having a width sufficient to extend laterally across both eyes and a length sufficient to cover both eyes, wherein the fore-mask panel and the anterior sun visor are disposed as two layers extending against one another from the posterior visor cap portion.

2. The equine sun visor assembly of claim 1 wherein:

the anterior sun visor material is substantially water-repellant and adapted to generally shield the eyes of the horse from direct precipitation.

3. The equine sun visor assembly of claim 2 wherein:

the anterior sun visor material blocks at least 96 percent of all incident ultraviolet light.

4. The equine sun visor assembly of claim 3 wherein:

the anterior sun visor includes at least one material selected from the group of opaque fabrics consisting essentially of:

backpack nylon fabric;
pack cloth nylon fabric; and
rip-stop nylon fabric.

5. The equine sun visor assembly of claim 4 wherein:

the posterior visor cap portion includes at least one material selected from the group of opaque fabrics consisting essentially of:

backpack nylon fabric;
pack cloth nylon fabric; and
rip-stop nylon fabric.

6. The equine sun visor assembly of claim 1 wherein:

the fore-mask panel is formed of a material that blocks at least 80 percent of all incident ultraviolet light.

7. The equine sun visor assembly of claim 6 further comprising:

a fore-mask stabilizer fixed to the fore-mask panel and extending from the posterior visor cap portion for a distance sufficient to cover at least part of a portion of the fore-mask panel disposed above the eyes.

8. The equine sun visor assembly of claim 7 wherein:

the fore-mask stabilizer is formed of at least one material selected from the group of coated mesh fabrics consisting essentially of:

an 80% opaque PVC-coated woven polyester fabric;
a 90% opaque PVC-coated woven polyester fabric;
a 95% opaque PVC-coated woven polyester fabric.

9. The equine sun visor assembly of claim 6 wherein:

the fore-mask panel is formed of at least one material selected from the group of coated mesh fabrics consisting essentially of:

an 80% opaque PVC-coated woven polyester fabric;
a 90% opaque PVC-coated woven polyester fabric;
a 95% opaque PVC-coated woven polyester fabric.

10. The equine sun visor assembly of claim 1 wherein:

the anterior sun visor material blocks at least 96 percent of all incident ultraviolet light.

11. The equine sun visor assembly of claim 1 further comprising:

a muzzle seal disposed at the fore-mask panel below the eyes to substantially prevent insects and debris from passing under the fore-mask panel.

12. The equine sun visor assembly of claim 1 wherein:

the anterior sun visor has a length sufficient to extend from the anterior of the posterior visor cap portion to the eyes.

13. The equine sun visor assembly of claim 1 further comprising:

a fore-mask stabilizer fixed to the fore-mask panel and extending from the posterior visor cap portion for a distance sufficient to cover at least part of a portion of the fore-mask panel disposed above the eyes.

* * * * *